(12) United States Patent
Maclaren-Taylor

(10) Patent No.: US 9,526,381 B2
(45) Date of Patent: Dec. 27, 2016

(54) MOUNTING SYSTEM

(75) Inventor: Andrew Keith Maclaren-Taylor, Johannesburg (ZA)

(73) Assignee: Andrew Keith Maclaren Taylor, Johannesburg (ZA)

( * ) Notice: Subject to any disclaimer, the term of this patent is extended or adjusted under 35 U.S.C. 154(b) by 17 days.

(21) Appl. No.: 14/131,258

(22) PCT Filed: Jul. 6, 2012

(86) PCT No.: PCT/ZA2012/000046
§ 371 (c)(1),
(2), (4) Date: Jan. 14, 2014

(87) PCT Pub. No.: WO2013/006872
PCT Pub. Date: Jan. 10, 2013

(65) Prior Publication Data
US 2014/0138505 A1 May 22, 2014

(30) Foreign Application Priority Data
Jul. 7, 2011 (ZA) .................................. 2011/04980

(51) Int. Cl.
*A47K 10/10* (2006.01)
*A47K 5/02* (2006.01)
(Continued)

(52) U.S. Cl.
CPC ................. *A47K 10/10* (2013.01); *A47K 5/02* (2013.01); *A47K 10/04* (2013.01); *A47K 10/12* (2013.01);
(Continued)

(58) Field of Classification Search
CPC ................ A47K 10/10; A47K 2201/02; Y10T 403/1683; F16B 37/047; F16B 37/0807; F16B 37/145
See application file for complete search history.

(56) References Cited

U.S. PATENT DOCUMENTS 1,636,364 A * 7/1927 Hoegger ................ A47K 10/10
16/DIG. 24
1,887,641 A * 11/1932 Hoegger ................ A47K 10/10
52/27
(Continued)

FOREIGN PATENT DOCUMENTS

DE EP 0421321 A1 * 4/1991 ............. A47K 10/10
DE EP 0421321 B1 * 2/1994 ............. A47K 10/10
(Continued)

OTHER PUBLICATIONS

PCT/ZA2012/000046 International Search Report dated Dec. 7, 2012 (4 pages).

Primary Examiner — Joshua J Michener
Assistant Examiner — Chiedu Chibogu
(74) Attorney, Agent, or Firm — Michael Best & Friedrich LLP

(57) ABSTRACT

The invention provides a mounting system for a wall mounted accessory which includes a first component (12), which is attachable to a wall (13), having a spigot (30), and a second component (14), to which the accessory (16) is attached, which has a tubular element (20) and a clamping means (22) which projects into an interior of the tubular element, which has, at one end, a clamp head (46) and which is actuatable, when the tubular element is passed over the spigot (30) and the spigot (30) is located between the clamp head (46) of the clamping means and an inner wall (72) of the tubular member, to draw the clamp head (46) into abutment with the spigot to clamp the spigot between the clamp head and the inner wall.

14 Claims, 5 Drawing Sheets

(51) Int. Cl.

| | | |
|---|---|---|
| *F16B 37/04* | (2006.01) | |
| *A47K 17/02* | (2006.01) | |
| *A47K 10/04* | (2006.01) | |
| *A47K 10/12* | (2006.01) | |
| *F16B 37/14* | (2006.01) | |
| *F16B 9/02* | (2006.01) | |
| *F16M 13/02* | (2006.01) | |
| *A47K 10/02* | (2006.01) | |
| *F16B 37/08* | (2006.01) | |
| *F16B 45/00* | (2006.01) | |

(52) U.S. Cl.
CPC ............. *A47K 17/022* (2013.01); *F16B 9/026* (2013.01); *F16B 37/045* (2013.01); *F16B 37/047* (2013.01); *F16B 37/145* (2013.01); *F16M 13/02* (2013.01); *A47K 10/025* (2013.01); *A47K 2201/00* (2013.01); *A47K 2201/02* (2013.01); *F16B 37/0807* (2013.01); *F16B 45/00* (2013.01); *Y10T 403/1683* (2015.01); *Y10T 403/1691* (2015.01)

(56) References Cited

U.S. PATENT DOCUMENTS

| | | | | |
|---|---|---|---|---|
| 1,891,048 A * | 12/1932 | Keefe | .................. | 248/222.14 |
| 1,893,729 A * | 1/1933 | Call | .................. | A47B 57/46 |
| | | | | 248/222.14 |
| 1,962,739 A * | 6/1934 | Hoegger | ............. | A47K 10/10 |
| | | | | 248/222.14 |
| 1,997,686 A * | 4/1935 | Hoegger | ............. | A47K 1/09 |
| | | | | 248/222.14 |
| 2,191,613 A * | 2/1940 | Ericsson | ..................... | 292/350 |
| 2,479,580 A * | 8/1949 | Marce | ............. | F16L 27/0849 |
| | | | | 24/270 |
| 2,512,209 A * | 6/1950 | Marchand | ............ | 248/222.14 |
| 2,895,197 A * | 7/1959 | Agne | ................. | F16L 33/04 |
| | | | | 24/279 |
| 3,238,581 A * | 3/1966 | Sawyer | ................ | E05C 19/14 |
| | | | | 24/271 |
| 3,471,176 A * | 10/1969 | Gilchrist | ............. | F16L 41/06 |
| | | | | 285/111 |
| 3,537,736 A * | 11/1970 | Kroopp | ................ | E04B 1/5831 |
| | | | | 403/171 |
| 4,119,130 A * | 10/1978 | Berecz | ..................... | 411/104 |
| 4,566,662 A * | 1/1986 | Toshishige | .............. | 248/222.14 |
| 4,736,878 A * | 4/1988 | Rasor | ..................... | 224/321 |
| 4,861,207 A * | 8/1989 | Do | ..................... | 411/104 |
| 4,957,402 A * | 9/1990 | Klein et al. | ............. | 411/84 |
| 4,998,701 A | 3/1991 | Rawald | | |
| 5,026,012 A * | 6/1991 | Wang | ................. | A47K 10/10 |
| | | | | 248/222.14 |
| 5,076,523 A * | 12/1991 | Wang | ................. | A47K 10/10 |
| | | | | 248/222.14 |
| 5,228,798 A * | 7/1993 | Tzanovici | ............. | E05B 1/0015 |
| | | | | 292/350 |
| 5,244,193 A * | 9/1993 | Hehr | .................. | 269/99 |
| 5,609,003 A * | 3/1997 | Jouty | .................. | 52/585.1 |
| 5,779,119 A * | 7/1998 | Talbot et al. | ............ | 224/427 |
| 6,012,692 A * | 1/2000 | Meck | .................. | A47K 10/10 |
| | | | | 248/222.14 |
| 6,113,045 A * | 9/2000 | Kuo | .................... | A47K 10/10 |
| | | | | 211/105 |
| 6,568,644 B2 * | 5/2003 | Pedersen | ................. | 248/229.13 |
| 6,581,977 B1 * | 6/2003 | Dole et al. | ................. | 285/112 |
| 6,651,830 B2 * | 11/2003 | Pan | .................... | A47K 10/10 |
| | | | | 211/105.1 |
| 6,810,538 B2 * | 11/2004 | Ouyoung | ................ | 4/576.1 |
| D516,354 S * | 3/2006 | Sedwick | ................. | D6/550 |
| 7,117,647 B2 * | 10/2006 | Clarke | .................. | 52/233 |
| 7,594,367 B2 * | 9/2009 | Clarke | .................. | 52/233 |
| 8,128,043 B2 * | 3/2012 | Walter | ................. | 248/224.7 |
| 8,474,770 B2 * | 7/2013 | Reo et al. | ................. | 248/224.7 |
| 8,671,545 B1 * | 3/2014 | Zimmerman | ............ | F16M 13/02 |
| | | | | 211/123 |
| 2002/0088764 A1 * | 7/2002 | Pan | .................... | A47K 10/10 |
| | | | | 211/105.1 |
| 2002/0125282 A1 * | 9/2002 | Laverack et al. | ............. | 224/319 |
| 2005/0008430 A1 * | 1/2005 | Kahl | .................... | 403/231 |
| 2012/0126077 A1 * | 5/2012 | Reo et al. | ................. | 248/224.8 |
| 2012/0141226 A1 * | 6/2012 | Jackson | ................. | 411/315 |
| 2012/0168583 A1 * | 7/2012 | Hsu | .................... | A47K 10/10 |
| | | | | 248/222.14 |

FOREIGN PATENT DOCUMENTS

| | | | | |
|---|---|---|---|---|
| DE | 19510941 A1 * | 9/1996 | ............. | A47K 1/08 |
| EP | 0390690 A1 * | 10/1990 | | |
| EP | 0421321 A1 | 4/1991 | | |
| EP | 1584276 A1 * | 10/2005 | ............. | A47K 10/10 |
| GB | 2054791 A * | 2/1981 | ............. | F16B 12/32 |
| GB | 2215425 A * | 9/1989 | ........... | E04B 1/0046 |
| GB | 2244427 A * | 12/1991 | ............. | A47K 10/10 |
| GB | 2215425 B * | 9/1992 | ........... | E04B 1/0046 |
| GB | 2371976 A * | 8/2002 | | |
| JP | 2727118 B2 * | 3/1998 | | |

* cited by examiner

MOUNTING SYSTEM

BACKGROUND OF THE INVENTION

This invention relates to a wall mounting system for bathroom or kitchen accessories.

Bathroom and kitchen accessories, for example towel rails, hooks, towel rings, soap dishes and the like, have to be attached to a wall surface with a mounting means. This means must be aesthetically pleasing and have the ability to attach the rail securely to the wall with a degree of permanence.

The problem with such means is that they are often visually expose part of the componentry used to attach the rail thus detracting from the aesthetics of the accessory.

Furthermore, an installer when installing the accessory, often does so incorrectly thus resulting in the rail loosening from the mounting means and, possibly, eventually detaching completely from the wall.

The invention aims to at least partially address the aforementioned problems.

SUMMARY OF INVENTION

The invention provides a mounting system for a wall mounted accessory which includes a first component, which is attachable to a wall, having a spigot, and a second component, to which the accessory is attached, which has a tubular element and a clamping means which projects into an interior of the tubular element, which has, at one end, a clamp head and which is actuatable, when the tubular element is passed over the spigot and the spigot is located between the clamp head of the clamping means and an inner wall of the tubular member, to draw the clamp head into abutment with the spigot to clamp the spigot between the clamp head and the inner wall.

The spigot may be a cleft spigot. To locate the spigot between the clamp head and the inner wall, the clamping means may pass into the cleft of the spigot.

The wall mounted accessory may be a towel rail, a towel ring, a soap dish or the like.

The first component may have a mounting plate from which the spigot projects. The base plate may be holed to allow a fastening means, for example screw or a nail, to pass to attach the first component to the wall.

The spigot may have an annular seat.

The accessory may include a holed cover plate that, in use, cover the mounting plate and which is holed to pass over the spigot to locate on the annular seat.

The clamping means may include a threaded elongate member, such as a screw, to which is engaged, at one end, the clamp head. When the threaded member is actuated, by rotation, the clamp head is drawn, along the threads of the member, towards the spigot.

The spigot may include a recessed formation within which the clamp head locates.

The recessed formation may have a base and sloping surface which, in use, faces the wall and which leads to the base. The sloping surface may direct the clamp head axially inwardly, towards the wall, and downwardly towards the base.

The recessed formation may be adapted such that, when the clamp head is drawn therein, an axial force is imposed that draws the second component axially towards the first component.

Preferably, the clamp head is barrel shaped.

Another aspect of the invention provides a mounting system for a wall mounted accessory which includes a first component, which is attachable to a wall, having a cleft spigot, and a second component, attached to the accessory, which has a tubular element and a clamping means, which is located in the tubular element, having at one end a clamp head, wherein, when the tubular element engages with the spigot in attachment of the accessory to the wall, the clamping means at least partially locates within a cleft of the spigot to position the clamp head adjacent an inner-facing side of the spigot, and wherein the means is actuable to draw the clamp head into abutment with the spigot to clamp the spigot between the clamp head and an inner wall of the tubular element.

BRIEF DESCRIPTION OF THE DRAWINGS

The invention is further described by way of examples with reference to the accompanying drawings in which.

DESCRIPTION OF PREFERRED EMBODIMENTS

Figure 1:
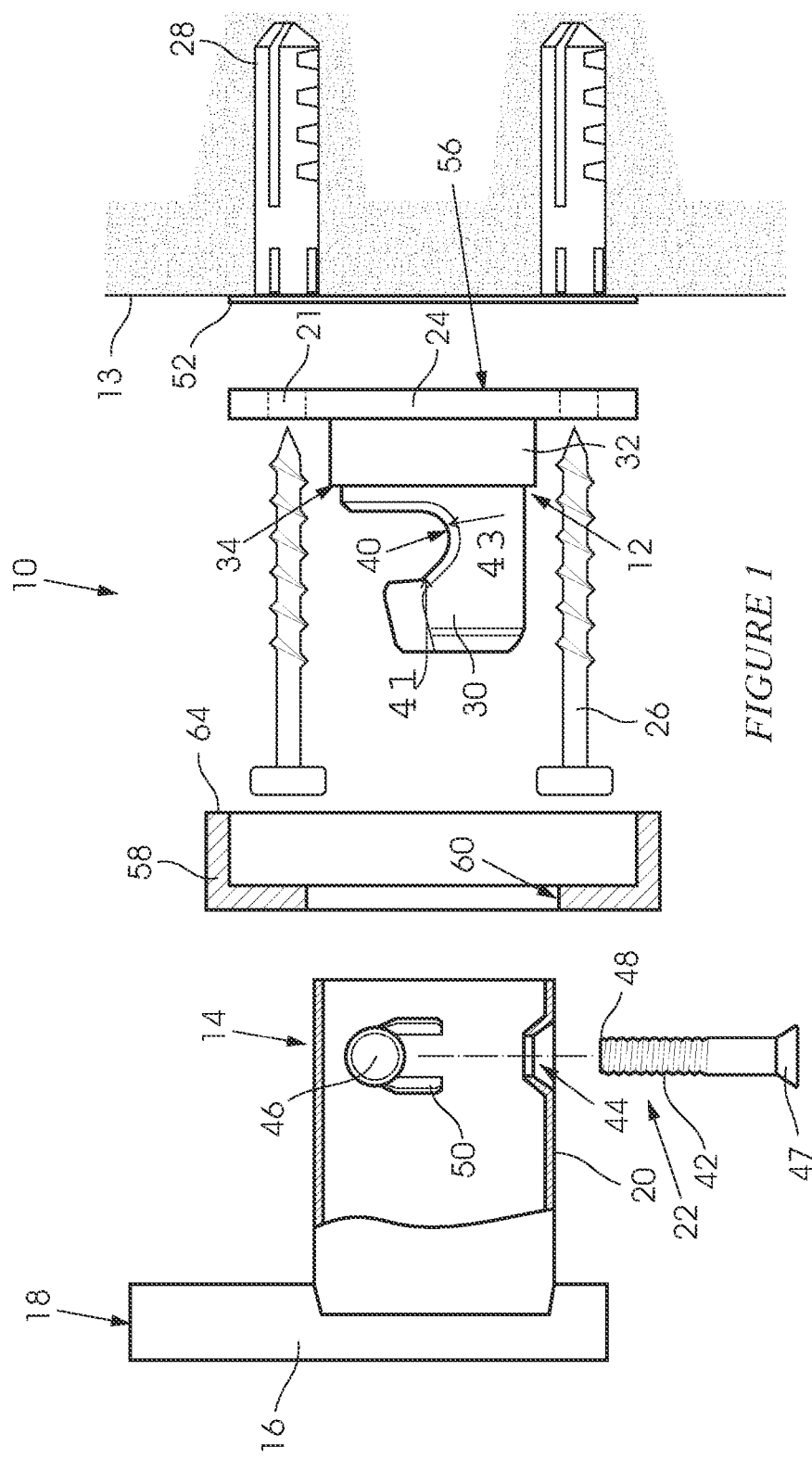
FIG. 1 is an exploded partially cross-sectional side view of a mounting system in accordance with the invention.
Figure 2:
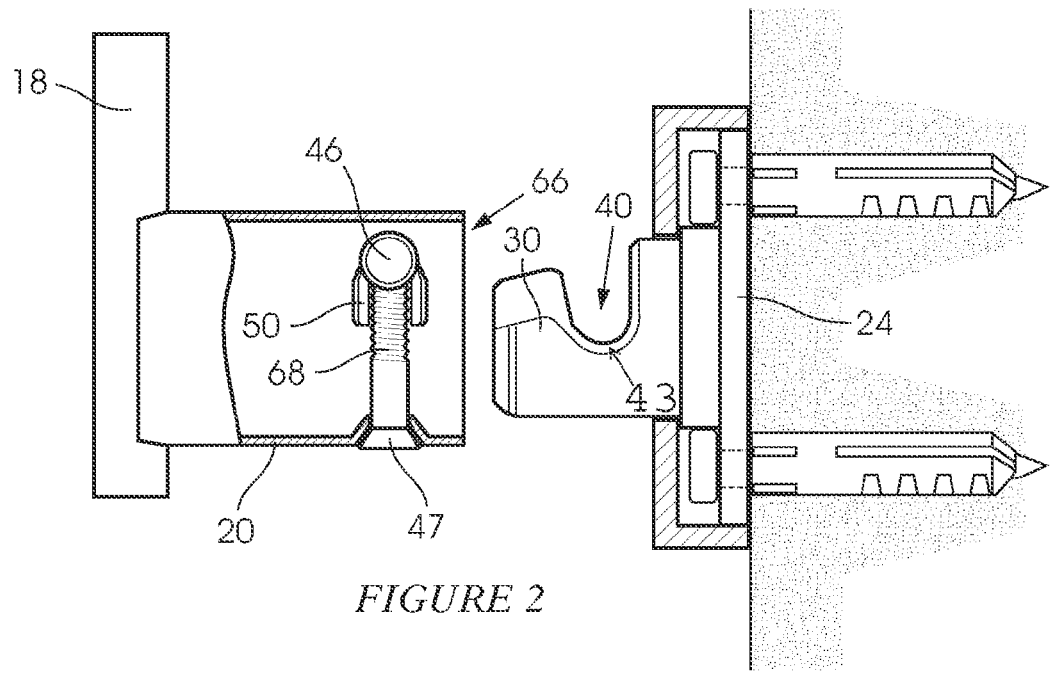
FIG. 2 is a side view of the mounting system illustrating a first component attached to a wall.

FIGS. 1 and 2 of the accompanying drawings illustrates a mounting system 10 according to the invention, which includes a first wall mountable component 12, which attaches to a wall 13 in use, and a second component 14 to which is attached a wall mounted accessory 16, which, in this particular example is a hook 18. The second component includes a tubular element 20 and a clamping means 22.

The first component 12 includes a circular wall mount plate 24, through which is formed a pair of arc shaped slots 21 (see FIG. 5), through each of which a fastening means 26, such as a screw or a nail, passes to secure the plate to the wall. The arcuate shape of the slots allows rotation of the plate, relatively to the wall, when the screws are passed through the slots and engaged with plugged drill holes 28, to optimise positioning of the plate prior to fastening the plate to the wall.

Figure 5:
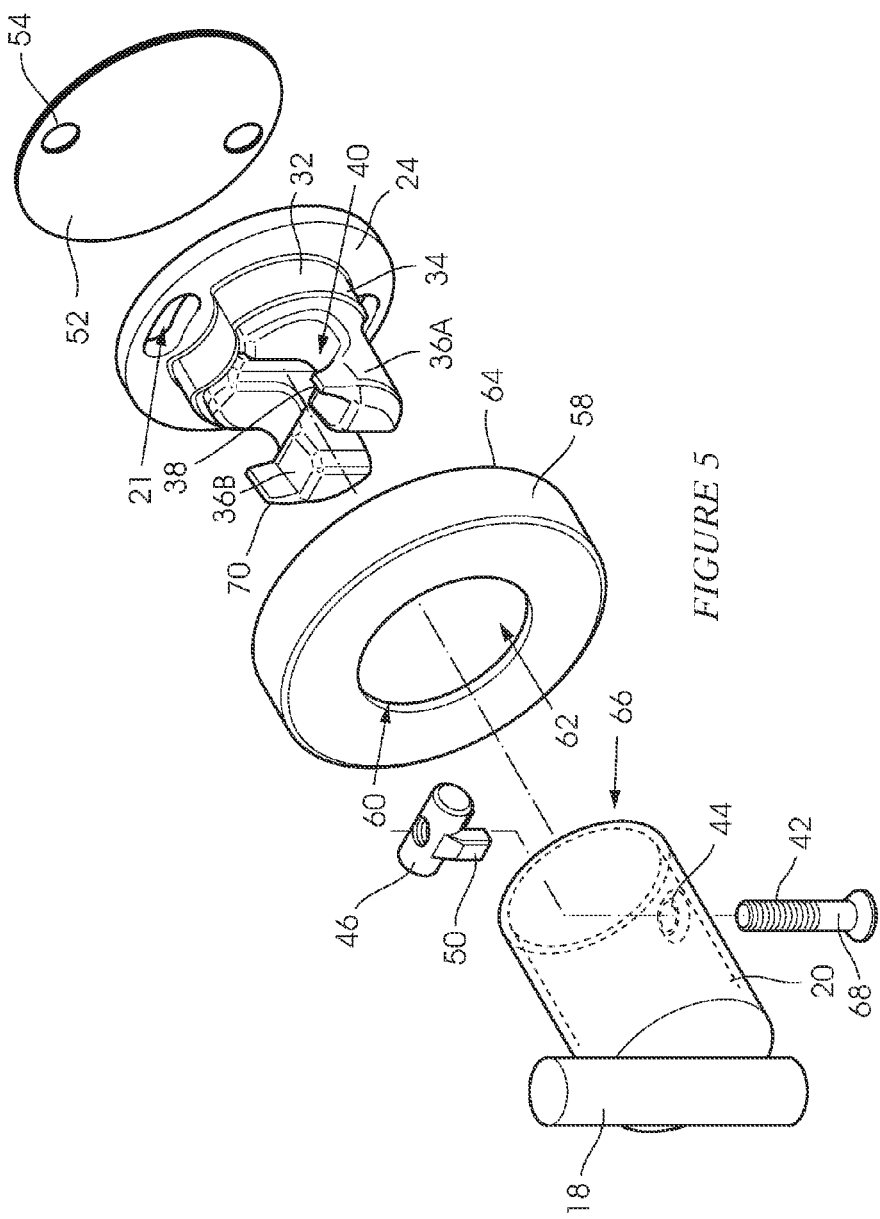
FIG. 5 is an exploded perspective view of the components making up the mounting system.

From the plate 24 projects a cleft spigot 30 mounted atop a cylindrical base 32. An annular seat 34 is defined between the base and the spigot (see FIG. 5 which best illustrates this). With reference to FIG. 5, the spigot has a pair of fingers, respectively designated 36A and 36B, between which a cleft 38 is defined. Arranged across the fingers, in a direction perpendicular to the axial direction of the spigot and tubular element, is a recessed formation 40. The recessed formation has a sloping surface 41 and a base 43.

Figure 6:
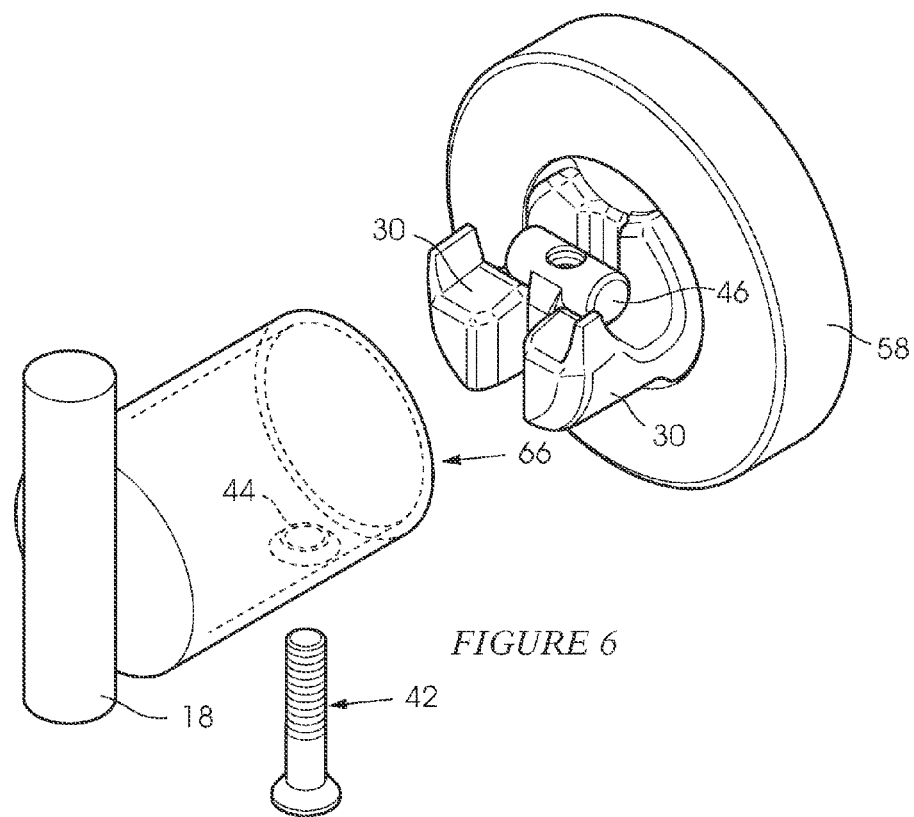
FIG. 6 is a partially exploded view in perspective of the mounting system.

The clamping means 22 includes, in this particular embodiment, a blunt-end screw 42 which is passes through a hole 44 formed in a wall of the tubular element 20 to project into an interior of the element, with a head end 47 abutting up against the hole perimeter. A clamp head 46 is threadedly engaged with a threaded end 48 of the screw. The clamp head is barrel shaped and has a pair of locating formations 50 which, when the clamp head is engaged with the screw, project towards the hole. The clamp head 46 is complementarily shaped to the recessed formation 40 as illustrated in FIG. 6.

To mount the accessory 16 to the wall, firstly, a vinyl circular sticker 52, which is of complementary dimension to the plate 24, is applied to the wall, in a position which, ultimately, is desired for the mounting system 10 and wall mounted accessory 16. Each side of the sticker has an adhesive substance to aid in adherence of the sticker to the wall and the plate to the sticker. The sticker can have circular marks 54 pre-marked thereon to indicate, to an installer, where to make the plugged drill holes 28.

After making the drill holes 28, the plate 18 of the first component is then placed over the sticker and appropriately positioned so that each slot 21 is partially in register with a respective drill hole. A screw 26 is then passed through each slot, into each plugged drill hole, and then after an opportunity to manipulate the position of the plate as described above, the screws are screwed into their respective holes to fasten the plate, and the first component 12, firmly in place on the wall 13. A wall facing surface 56 of the plate can include a plurality of ridged formations (not shown) to improve the adherence of the plate to the sticker.

Thereafter, a holed cover plate 58 is passed over the first component 12 until a perimeter edge 60 of a cover plate hole 62 abuts the seat 34. In this position, a leading annular rim 64 of the cover plate does not touch the wall 13 to ensure that when the second component 14 is attached with the first component 12, the forces imposed by the attachment are transmitted through the first component and not through the cover plate, which will potentially buckle the plate. However, to maintain aesthetics, the gap between the wall and the rim 64 is very small.

Figure 3:
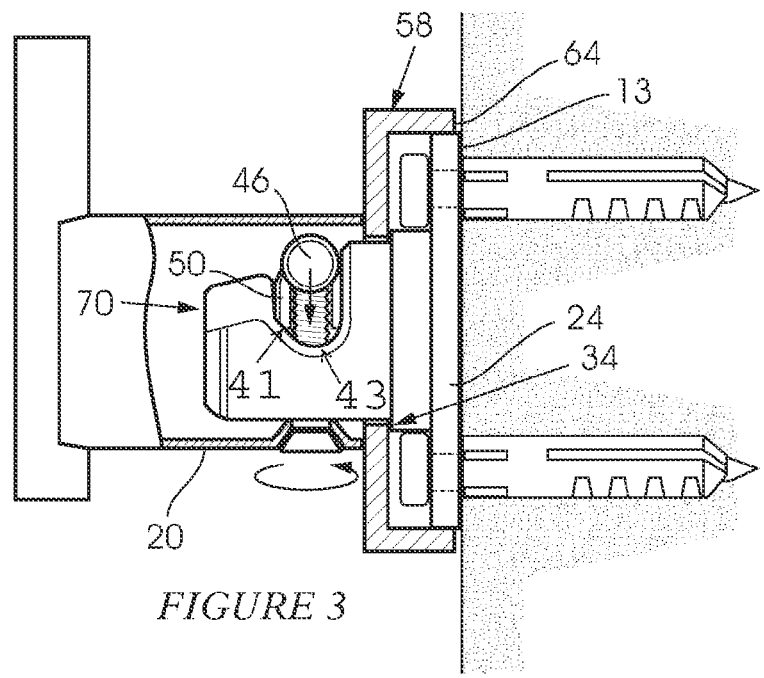
FIG. 3 is a side view of the mounting system, with a second component engaged with the first component.
Figure 7:
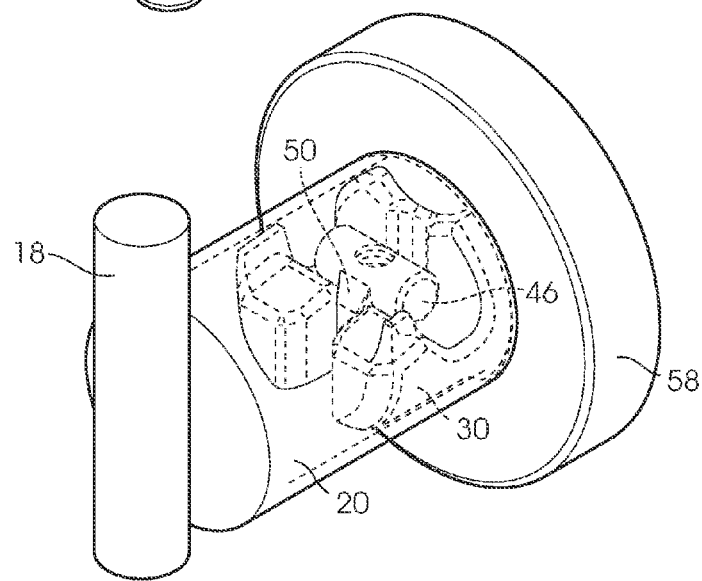
FIG. 7 is a perspective view of the mounting system.

An open end 66 of the tubular element 20 is then passed over the spigot 30, as a shaft 68 of the screw 42 slots into the cleft 38, aided by the guiding formations 50 of the clamp head 46 which ensure that the clamp head is appropriately positioned to lie transverse to the direction of passage (see FIG. 2) until the open end abuts the cover plate 58 as illustrated in FIG. 3. In this engaged configuration, as illustrated best in FIGS. 3 and 7, the clamp head 46 lies above the recessed formation 40.

Figure 4:
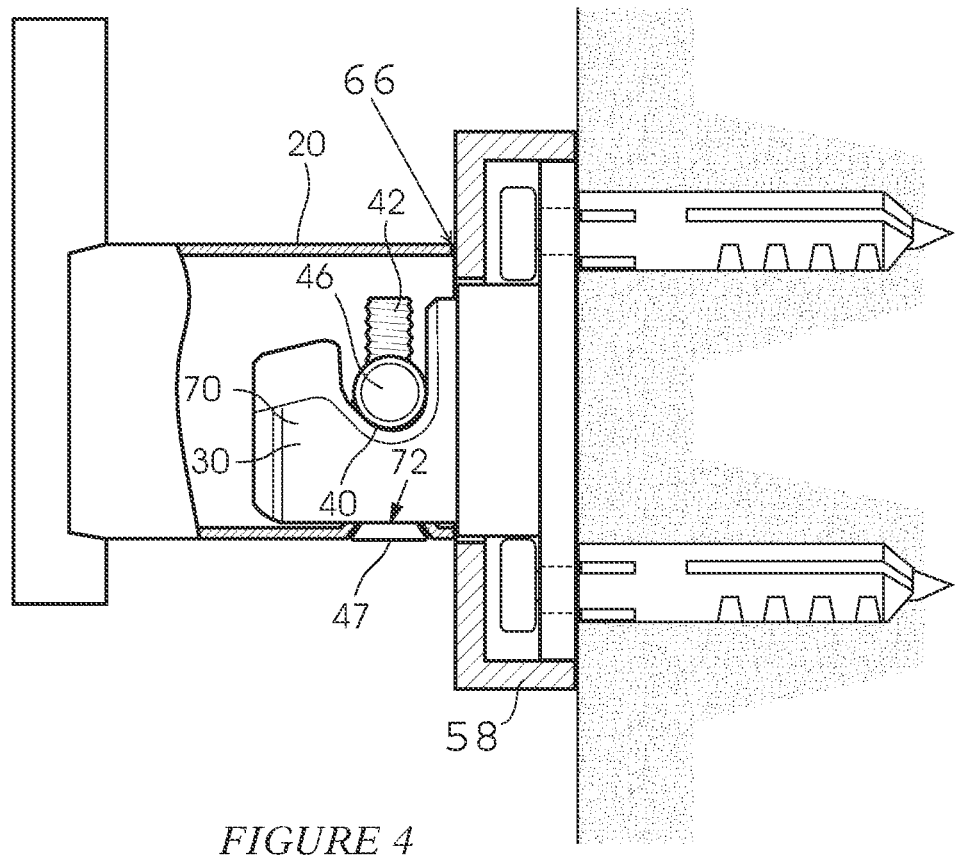
FIG. 4 is a side view of the mounting system, with a second component engaged with the first component.

To secure the second component 14 to the first component 12, an allen key, for example, is engaged with a complementary recess which is externally presented in the head end 47 of the screw 42 to axially rotate the screw thereby driving the threaded end 48 of the screw into and through the clamp head 46. The clamp head is prevented from rotating, as the screw 42 is rotated, by the locating formations 50 and the clamp head itself abutting the walls of the cleft 38 and a pair of clawed projections 70, one each at the end of each finger 36. Thus, the turning of the screw 42 in the clamp head has the effect of drawing the clamp head towards the recessed formation until the clamp head comes into contact with the formation 40 as illustrated in FIG. 4.

With further rotation of the screw, the clamp head 46 comes into contact, and is drawn along, the sloping surface 41 of the recessed formation 40. The slope of the surface 41 forces the clamp head downwardly, towards the base 43, and inwardly, towards the wall 13. An axially directed force is thereby imparted on the clamp head, and the tubular member element 20, to draws the open end 66 tightly against the cover plate 58, as illustrated in FIG. 4.

The transverse "clamping" force imposed by the downward movement of the clamp head on the recessed formation 40, as it continues its advance down the threads of the screw 42, draws the spigot 30 tightly against an inner wall 72 of the tubular element 20. The spigot is, essentially, clamped between the clamp head and the tubular element's inner wall, thereby fixing the second component 14, and the accessory 16, which in this case is a hook 18, to the mounting component 12.

By employing the mounting system 10, in accordance with the invention, the accessory 16 is securely attached to the wall 13 without loosening over time, at the point of attachment, to the same extent and rate as is the case with prior art systems.

Prior art systems typically employ grub screws to attach the counterparts of the first or the second component (12, 14) together. A grub screw will pass through a threaded aperture in one of the components to engage the other inner component fitted therein. The point of the grub screw contacts the surface of this inner component and pushes the component, in an expansive manner, against the outer component.

The disadvantage of such a system is inherent in the grub screws, which are relatively delicate with thin walls that are easily deformed when there are repeated attempts at tightening them with an allen key, and the threads of the aperture and the grub screw, which are prone to deformation due to the forces imposed through the grub screw by movement of the components. The degradation of the grub screws and the threads cause such mounting systems to loosen.

The invention claimed is:

1. A mounting system for a wall mounted accessory, which mounting system includes:
    a first component, which is attachable to a wall, having a cleft spigot with a recessed formation which has a base and a sloping surface which faces the wall and leads to the base, the cleft spigot including a cleft, and
    a second component, to which the wall mounted accessory is attached, which has a tubular element and a clamping means which projects into an interior of the tubular element, including a threaded elongate member and a clamp head which is threadedly engaged with the threaded elongate member attached,
    the clamp head being complimentarily shaped to the recessed formation to receive the clamp head in the recessed formation of the cleft spigot, such that when the tubular element is passed over the cleft spigot as a shaft of the threaded elongate member is inserted into the cleft of the cleft spigot, the threaded elongate member of the clamping means is rotatable relative to the clamp head to draw the clamp head along the threaded elongate member into contact with the sloping surface and to advance along the sloping surface towards the base thereby to draw the tubular element towards the wall and to clamp the cleft spigot between the clamp head and the inner wall of the tubular element.

2. A mounting system according to claim 1 wherein the first component has a mounting plate from which the cleft spigot projects.

3. A mounting system according to claim 2 wherein the mounting plate is holed to allow a fastening means to pass to attach the first component to the wall.

4. A mounting system according to claim 1 wherein the cleft spigot has an annular seat.

5. A mounting system according to claim 4 which includes a holed cover plate which passes over the spigot to locate on the annular seat.

6. A mounting system according to claim 2 wherein the spigot has an annular seat.

7. A mounting system according to claim 3 wherein the spigot has an annular seat.

8. A mounting system according to claim 6 which includes a holed cover plate which passes over the spigot to locate on the annular seat.

9. A mounting system according to claim 7 which includes a holed cover plate which passes over the spigot to locate on the annular seat.

10. A mounting system according to claim 1, wherein the cleft spigot includes a pair of fingers through which the cleft is defined.

11. A mounting system according to claim 10, wherein each finger has, at a respective end, a clawed projection which inhibits rotation of the clamp head in the recessed formation.

12. A mounting system according to claim 1, wherein the clamp head includes a guiding formation which aids the proper positioning of the clamp head in the recessed formation.

13. A mounting system according to claim 1, wherein the second component is cantilevered off of the first component.

14. A mounting system according to claim 1, wherein the second component is inserted into the first component after the threaded elongate member is connected to the clamp head.

* * * * *